United States Patent [15] 3,705,264
Harr [45] Dec. 5, 1972

[54] REMOTE DIGITAL DATA TERMINAL CIRCUITRY

[72] Inventor: Jerome Danforth Harr, San Jose, Calif.

[73] Assignee: International Business Machines Corporation, Armonk, N.Y.

[22] Filed: March 9, 1971

[21] Appl. No.: 122,392

[52] U.S. Cl. ....................178/88, 307/223, 307/224, 328/50, 340/347 DD

[51] Int. Cl. ..............................................H03k 23/24

[58] Field of Search................328/37, 41, 43, 50, 51; 307/220, 221 R, 223, 224; 340/167, 168 R, 168 S, 168 C, 334, 347 DD; 178/68, 69 R, 69 G

[56] References Cited

UNITED STATES PATENTS 3,493,933 2/1970 Brooks..............................340/168 S
3,284,640 11/1966 Lindell..............................307/211 R
3,582,902 6/1971 Hirtle et al...................307/211 R X

*Primary Examiner*—Benedict V. Safourek
*Attorney*—Hanifin and Jancin and George E. Roush

[57] ABSTRACT

A digital data terminal operating from a two-wire transmission line is arranged for transmitting digital data on the same transmission line in the opposite direction. A number of electric switching elements which are opened or closed in accordance with digital data to be transmitted, are sensed with appropriate circuitry comprising a capacitor (or other electric state manifesting element) and circuit isolation diodes for each electric switching element and common initializing circuitry and sensing commutator circuitry. Preferably a shift register otherwise present for deserializing incoming data and timing wave generation is arranged for controlling the commutating function as incoming data is rippled through the shift register. Frequency division, amplitude division or time division multiplexing separates the signals on the transmission line for recognition at the terminals.

12 Claims, 4 Drawing Figures

INVENTOR
JEROME D. HARR
BY George E. Harr
ATTORNEY

PATENTED DEC 5 1972 3,705,264

SHEET 2 OF 2

REMOTE DIGITAL DATA TERMINAL CIRCUITRY

The invention is a parallel to that invention of Ulrich Klose described and claimed in the copending U. S. patent application Ser. No. 847,858 for "Data Transmission System" filed on August 6, 1969 and thereafter issued as U. S. Pat. No. 3,614,318 on Oct. 19, 1971. The invention is also applicable for use with the apparatus described and claimed in the copending U. S. patent application serial number 829,642 for "-Mechanical Power Transmission System" of Reynold Benjamin Johnson and Ralph Eugene Marrs filed on June 2, 1969 and thereafter issued as U. S. Pat. No. 3,572, 142 on the Mar. 23, 1971, but it is not limited thereto.

The invention relates to data transmission systems and it particularly pertains to such systems wherein data is transmitted in two directions between a central data processing station and one or more remote terminal substations.

The transmission of data from a central station to remote terminal station under the control of a computer or data processing system affords the use of simpler remote terminal stations in reducing the number and cost of the complex and expensive synchronizing circuits. To date the majority of the remote terminals are still expensive; however, many have exerted efforts to reduce the size, cost and complexity of remote terminals. One example is the above-identified invention in which each terminal includes a plurality of polarity-sensitive switching stages of alternating opposite polarity orientation for rippling the concatenated stages with signals of alternating polarity on the transmission line. Other arrangements and component circuitry which have been developed toward a reasonable solution to the problem are to be found in the following United States patents:

| | | | |
|---|---|---|---|
| 2,689,950 | 9/1954 | Bayliss et al. | 340-183 |
| 2,854,658 | 9/1958 | Jones. | 340-354 |
| 3,358,083 | 12/1967 | Helm. | 178-50 |
| 3,440,607 | 4/1969 | Abramson et al. | 340-163 |
| 3,482,114 | 12/1969 | Marshall | 307-221 |
| 3,482,264 | 12/1969 | Cohen et al. | 3401-172.5 |
| 3,482,265 | 12/1969 | Cohen et al. | 3401-172.5 |
| 3,516,073 | 6/1970 | Goss et al. | 3401-172.5 |

and in the literature:

IBM Technical Disclosure Bulletin Vol. 12, No. 1, June 1969; page 53; "Two-Wire Contact Sense with Interrupt"; T. J. Harrison.

IBM Technical Disclosure Bulletin Vol. 12, No. 8, January 1970; page 1180; "Simultaneous Two-Way Data Transmission over Coaxial Line"; A. F. Leon and C. A. Walton.

These prior art arrangements were helpful in advancing the art to the present state. The check signal counting means and circuitry for accurate control and linear digital filters in time division multiplexing afforded greater accuracy in the reception of data than did systems having priority communications with data and control character discrimination. A significant advance was made in the cyclically-scanned remote terminal system having answer back with time slots for the remote terminals to transmit to the central station. The introduction of SCR sequencing shift registers and temperature-compensated switch closure sensing circuitry enabled lower cost systems to be designed.

According to the invention, the objects indirectly referred to above and those which will appear as the specification progresses are attained in digital data terminal circuitry wherein data to be transmitted from the remote terminal to the central terminal is manifested in the opening or closing of a multiple of electric switching elements, for example, reed relay type switches actuated by the movement of type bars and the like of data processing systems typewriters; electronic switching circuit elements may also be used. The status of the electric switching elements is reflected in the operation of electric state manifesting elements. Capacitors, for example, may be connected to show the opening or closing of electric switch contacts by the state of potential charge on the capacitor. Binary data is preferably denoted by the presence of full voltage charge and the absence of any charge, but multiple states may be determined by quantizing arrangements. Inductors and associated current flow measuring resistors are preferred for multiple digit order determination; decade indication is not difficult with such components. It is also contemplated according to the invention that circuitry comprising active devices may offer advantages. The Esaki diode exhibits a characteristic operating current curve having an unstable peak and a stable valley that lends a great deal to fast and reliable determination for binary data. This curve being one of many termed "reversing curves" also lends itself to ternary data by using differentiating circuitry to determine the slope change-over level. The unijunction transistor also exhibits such a "reversing curve" and is contemplated for current flow state manifestation. Variable capacitance diodes conceivably may be used where the associated circuitry affords capacitance measuring. The four-layer diode and the four-layer triode or silicon control rectifier (SCR) device may be used where the associated circuitry affords measurement of current flow, voltage, or resistance.

A practical arrangement according to the invention is directed to remote binary data terminal circuitry of the type comprising a shift register type of circuit arrangement used to operate solenoids and lamps in response to data received over a transmission line at the remote terminal. The solenoids and lamps may be types which have operating characteristics slow enough so that data may be rippled through the shift register without bringing the solenoids or lamps to full activation until the shift register is completely loaded and adequate current flow is established. By means of a charge storage element and a pair of diode elements for each switch element to be sensed and a common transistor charging and pulse generating circuit, the electric switch elements are sensed sequentially as the data is shifted into the register by means of charging and sensing circuitry intercoupling the switch sensing circuitry and the shift register circuitry. Preferably storage capacitors are used for the charge storage devices and semiconductor diodes are used with simple electric switches. Other electric state manifestation elements as discussed above may be used as desired.

Reduced cost and improved performance is afforded by silicon-control rectifiers used as active elements in the shift register stages. Other shift register or distributor circuitry also may be used, however, as desired.

In order that the full advantages of the invention may be obtained in practice, a preferred embodiment thereof and alternative embodiments, given by way of examples only, are describe in detail hereinafter with reference to the accompanying drawing, forming a part of the specification, and in which.

Figure 1:
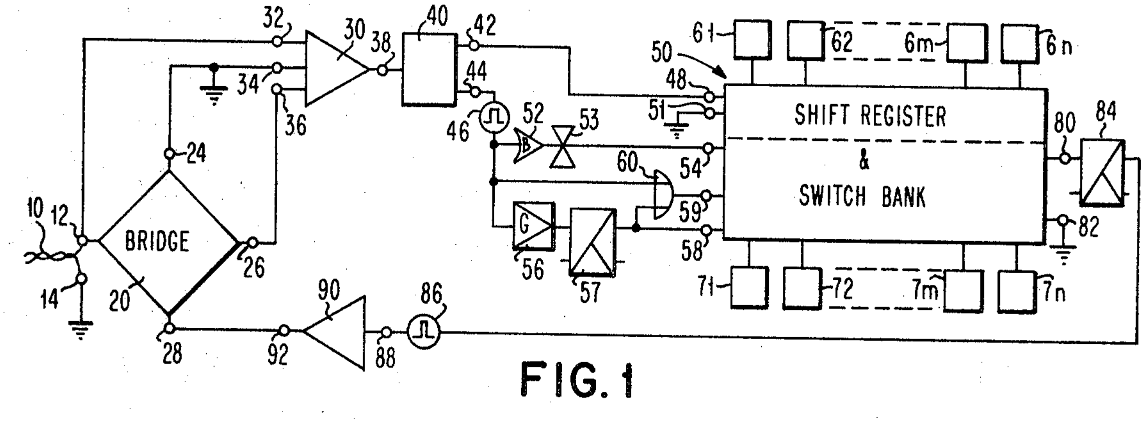
FIG. 1 is a functional diagram of a circuit arrangement according to the invention.

The functional diagram of a remote terminal employing circuitry according to the invention is shown in FIG. 1; however, it should be understood that the circuitry of the invention is not limited to such terminals. Digital data to be transmitted in either direction is applied to a transmission line 10 shown here as being of the twisted pair type, although open wire lines and coaxial conductor lines also may be used. One end of the transmission line 10 terminates in terminals 12 and 14, the latter of which is preferably connected to a point of fixed reference potential shown here as ground. The input terminals 12 and 14 are connected to an impedance bridge network 20 which may be entirely conventional in all respects. The bridge network 20 has four terminals 12, 24, 26, and 28. In many practical installations the impedance element between the terminals 12 and 24 of the bridge will be the effective characteristic impedance of the transmission line 10 down the line from the terminals 12 and 14. This characteristic impedance of the transmission line 10 will be balanced in the bridge network 20 by impedance elements connected between the terminals 24 and 26 and 26 and 28 and 12 and 28. These impedance elements in many practical installations will comprise resistance elements of the proper resistance values. The transmission line 10 is connected to one side of a differential amplifying circuit 30 at one balanced input terminal 32 and a neutral potential input terminal 34 shown here as connected to a common point of reference potential or ground. The terminal 26 of the bridge network 20 diagonally from the terminal 12 is connected to another balanced input terminal of the amplifier 30. Single ended output of the differential amplifier 30 appearing at output terminals 38 is applied to a distributor 40 having data signal output terminals 42 and auxiliary signal output terminals 44 connected to a pulse generator 46. The data signal terminals are connected to data signal input terminals 48 of interconnected shift register and switch bank circuitry 50 having a terminal 51 connected to the point of common reference potential shown here as ground. A shift pulse generating circuit connected to the output of the generating circuit 46 comprises a biased differentiator circuit 52 and an inverting circuit 53 connected to shift pulse input terminals 54 of the shift register and switch bank circuitry 50. Reset pulses are generated by a gap detector 56 connected to the generating circuit 46. In some instances it may be desirable to interpose a monostable reciproconductive or flip-flop circuit 57 for regenerating reset pulses applied to initializing reset input terminals 58 of the shift register and switch bank circuitry 50 and to register reset terminal 59 through an OR gating circuit 60 which also passes the pulse output of the generating circuit 46.

The shift register and switch bank circuitry 50 is arranged, as will hereinafter be described, for actuating a number of devices 61, 62 . . . **6*m* and 6*n* at the remote terminal in accordance with the data received over the transmission line 10. In accordance with the invention as the devices 61 . . . 6*n* are readied for operation, data is extracted from a number of other devices 71, 72 . . . 7*m* and 7*n* located at the terminal and delivered as serial binary data at output terminals 80 and 82, the latter of which is maintained at the common reference potential level shown here as ground. A monostable flip-flop circuit 84 is arranged to excite a generating circuit 86. The generating circuit 86 in turn applies signal to a single-ended amplifying circuit 90. Output terminals 92 of the amplifying circuit 90 are connected to the terminals 28 of the bridge network 20 as shown. The amplifying circuit 90 operates against reference potential so that in effect the output is applied between terminals 28 and 24 of the bridge network 20**. The operation of the circuit arrangement shown functionally in FIG. 1 will be set forth in detail hereinafter.

Figure 2:
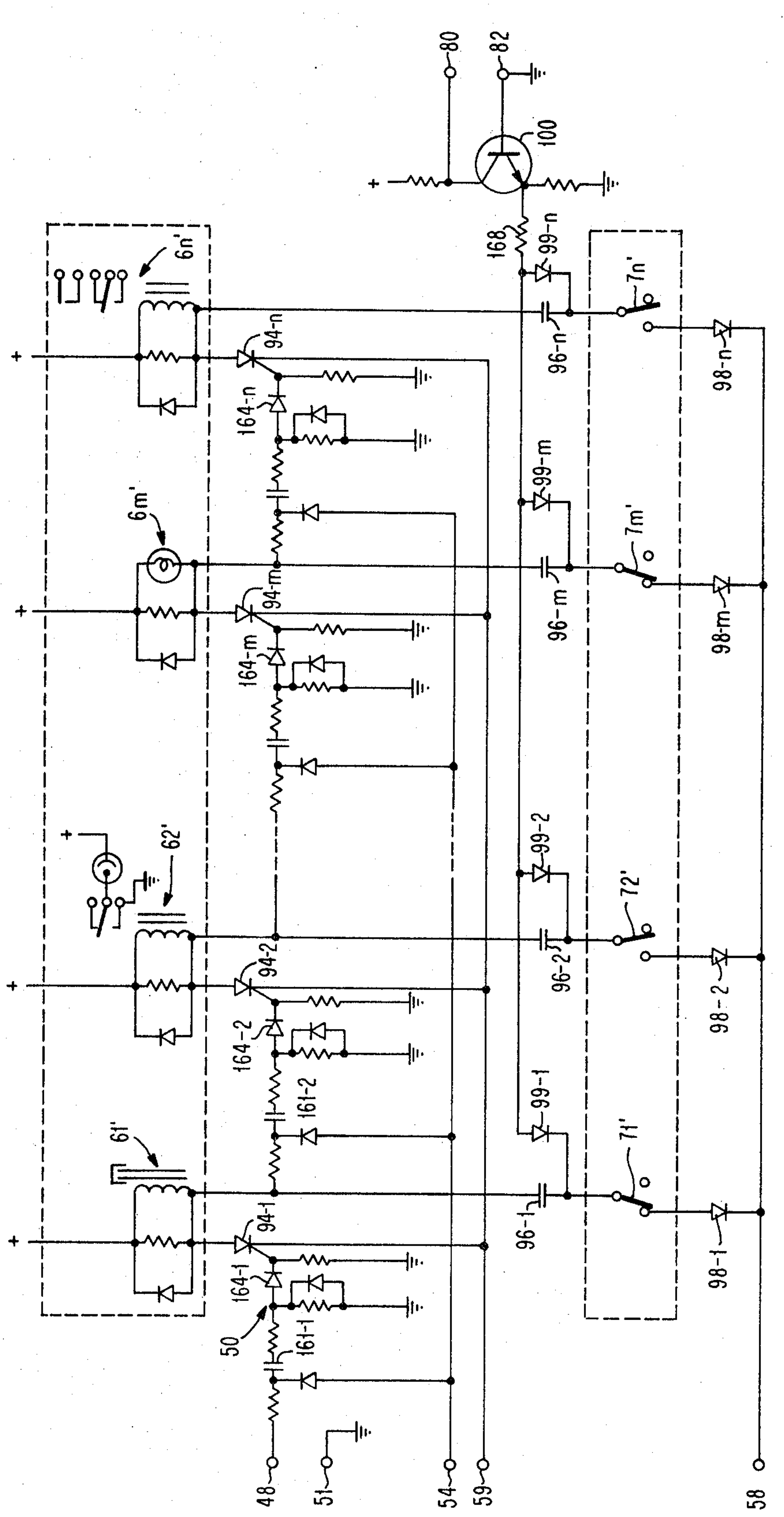
FIG. 2 is a schematic diagram of a portion of the components of the functional diagram shown in FIG. 1.

FIG. 2 schematically illustrates a preferred embodiment of the interconnected shift register and switch bank 50 and exemplary embodiments of the devices 61 . . . **6*n* and 71 . . . 7*n*. In this example the devices to be operated are shown as a plunger operating solenoid 61', a relay 62', a lamp 6*m*' and another relay 6*n*'. Obviously, all of the devices may be solenoids, or lamps, and the like. The data sensing devices are shown as single pole double throw switches 71'–7*n*', but it should be understood that those skilled in the art may substitute other devices as desired in accordance with the teaching of the invention. Four stages of a multistage shift register are shown. Each stage comprises one four-layer triode or silicon controlled rectifier (SCR) 94-1, 94-2 . . . 94-*m* and 94-*n***. The SCR devices used in this example afford a low-cost compact shift register capable of handling and controlling the power required to operate solenoid devices and the like. Those skilled in the art may use shift registers using other conventional devices in accordance with the teachings of the invention as they so desire. SCR devices have quite non-linear operating curves which aid in performing the functions of the circuitry according to the invention in that according to the invention data is rippled through the shift register sufficiently rapidly that the solenoid devices, lamps, and the like are not actuated on ripple through but receive sufficient current for complete actuation at the completion of the loading of the register. Solenoids and relays generally exhibit the required characteristics. Incandescent lamps have similar characteristics but neon lamps normally must be operated by way of a relay having the desired characteristics as shown. The remaining circuitry of the shift register portion is entirely conventional and needs no discussion in detail.

According to a preferred embodiment of the invention a number of capacitors 96-1, 96-2, . . . **96-*m*** and 96-$n$ are furnished one for each stage of the shift register. For each capacitor a diode element 98-1, 98-2, . . . 98-$m$ and 98-$n$ are required. In each stage of the shift register the capacitor, for example capacitor 96-1 is connected between the anode electrode of the corresponding SCR 94-1 and the arm of the switch 71′. Thus, in this embodiment the capacitors 96-$x$ individually manifest the status of the corresponding switches 71-$x$. The corresponding diode 98-1 is connected between another terminal of the switch 71′ and a conductor leading to the reset input terminals 58 in common. Other diodes 99-1, 99-2, . . . 99-$m$ and 96-$n$ have the cathode individually connected to the corresponding capacitors 96-1 . . . 96-$n$ and the anode electrodes connected by means of a common conductor and resistor 168 and a resistor 168 to the emitter electrode of a transistor 100. As the register 50 is shifted, the status of the switches 71-$x$ appears at the terminals 80–82 as will be described.

Figure 3:
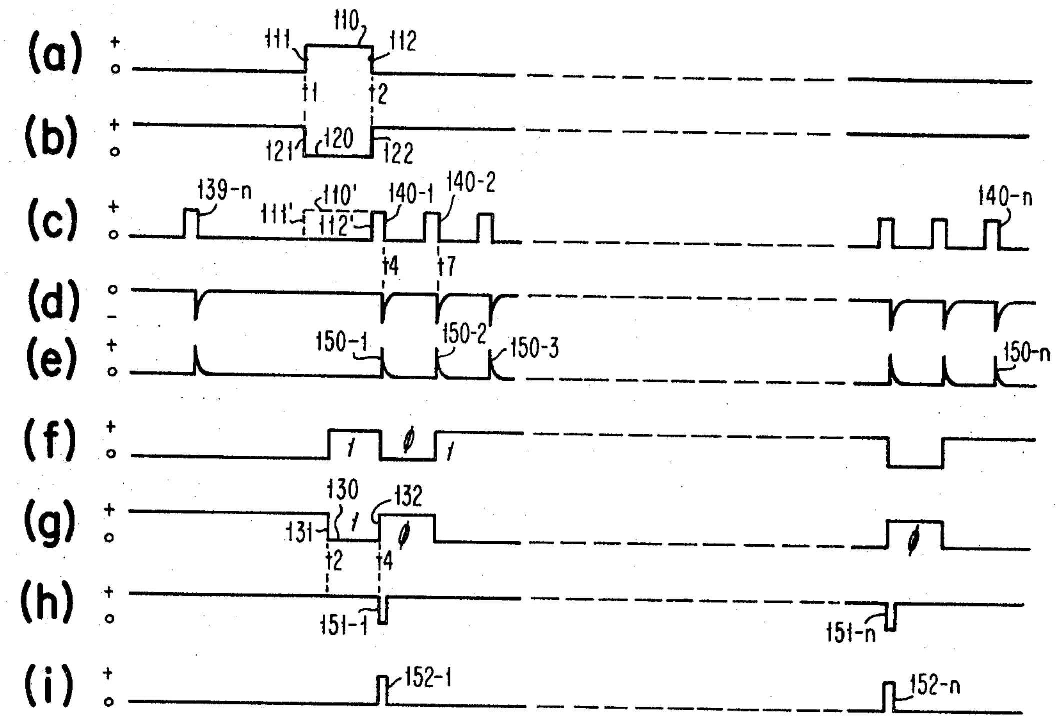
FIG. 3 is a graphical representation of wave forms useful in an understanding of the invention.

FIG. 3 is a graphical representation of wave forms useful in an understanding of the operation of this one exemplary embodiment of the invention. A register reset pulse 110 having transitions 111 and 112 as determined at the output of the gap detector is represented by the wave form in FIG. 3($a$). An initializing or reset pulse 120, which is the inverse of the former, is shown at FIG. 3($b$). In response to incoming central signal at terminals 44 of the distributor 40 the pulse generator 46 delivers register reset gating pulses 140-1, 140-2 . . . 140-$n$ as shown in FIG. 3($c$). The pulse 139-$n$ is the last pulse of the previous data and the gap detector 56 after initial operation at $t_0$ time generates a reset gating pulse beginning at $t_1$ time and lasting until $t_3$ time. The first gating transition 140-1, occurs at $t_3$ time and the trailing edge of the first pulse at $t_4$ time as shown in FIG. 3($c$). Shift pulses 150-1, 150-2, 150-3 . . . 150-$n$ are generated at $t_4$, $t_7$ times and so on. The output of the biased differentiator 52 is negative as shown in FIG. 3($d$). The necessary positive going pulses as shown in FIG. 3($e$) are obtained at the output of the inverter 53. An example of input data is illustrated in FIG. 3($f$) and the inverted form used in the SCR-TYPE shift register is shown in FIG. 3($g$). An inverter circuit is connected within the distributor 40 for such an application. According to the invention the input data pulse train for loading the shift register always contains a pulse 130 having transitions 131 and 132 occuring at $t_2$ and $t_4$ times. Binary naughts (0) are represented by zero reference or ground level and binary units (1) are represented by plus levels as shown in FIG. 3($f$), although if desired the inverse relationship may be used. The data represented by the switches appearing at the terminals 80 of the transistor 100 comprises negative going pulses 151-1 and 151-$n$ having transitions which nominally coincide in time with the transitions of the shift pulses 150-1 . . . 150-$n$ as shown in FIG. 3($h$); the output of the monostable circuit 84 as delivered to the generator 86 is shown at FIG. 3($i$).

One cycle of terminal data exchange can be defined by briefly noting the salient operating characteristics. The outgoing data generating device is first operated to set the switches 71′ . . . 7$n$′. A reset pulse 110 is applied to reset the shift register and the counterpart reset pulse 120 is applied to charge all capacitors 96-$x$ having the switches 71′ . . . 7$n$′ closed. The start bit 130 is then applied to ripple through the register without fully energizing the load devices 61′ . . . 6$n$′. This ripple through discharges the capacitors in seriatum through the transistor 100 for delivering output pulses accordingly in substantially synchronous timed relationship to the signals emanating from the controlling data processing unit. When all of the bits of data are shifted into the register there will be time before the next reset pulse for the load devices to be fully energized in those stages in which unit data is resting.

The shift register portion of the circuitry is used in more or less conventional fashion for deserializing incoming data. For this purpose almost any conventional shift register circuit can be used. According to the invention the shift register is also used to pulse the return data represented by the switch elements 71. Again almost any shift register or data distributor circuit can be used according to the teachings of the invention. The shift register using SCR devices as active elements shown in FIG. 2 is compact, inexpensive, reliable, and capable of handling relatively large current devices. The non-linear characteristic curve of the SCR device enhances the ripple through of data without actuation of the devices but this feature is not an absolute necessity.

In the shift register shown the coupling capacitors 161-1 . . . 161-$n$ determine the retriggering of the succeeding SCR devices 94-1 . . . 94-$n$ in accordance with the charges stored in the previous cycle. If an SCR device 94-1 . . . 94-$n$ is conducting the associated control diode 164-1 . . . 164-$n$ will conduct to trigger the subsequent SCR device into conduction. If the SCR device is not conducting the shift pulse will not be coupled through the capacitor. The register reset pulse 140 is applied to the SCR devices to interrupt the anode supply just before the shift pulse is applied to permit the latter to control the selective conduction of the stages and ripple the data through the register. The register reset pulses 140-1 . . . 140-$n$ are generated in the generator 46 which is under control of the central processing unit. The shift pulses 150-1 . . . 150-$n$ are generated from the register reset pulses by differentiating the edges of the latter, and biasing out the positive going spike at the leading edge. Positive going shift pulses appear at the output of the inverter 53.

The register shown operates as follows: the first or start bit 130 is always a 1 and is used to set the first SCR device. Conduction of this SCR device is then used to condition the coupling capacitor 161-X which will trigger the next stage down line. All of the SCR devices are then turned off briefly. The length of time they are off is small compared to the length of time spent conditioning the coupling capacitors. Then the shift pulse is applied to the gate input circuits of the SCR devices. If the capacitors were conditioned by the conducting state of a previous stage, then the SCR device will be turned on; otherwise it will remain off. In an SCR type shift register which has been built and operated, the data rate which the register accepted is 5K bits/sec. Thus, for a 23 stage register, all the data can be entered in less than 5 milliseconds. Since 5 ms is short compared to the pick and release times of many types of solenoids and the illuminating times of many lamps, the operation thereof will remain unaffected by the rapid stream of data rippled through the register. That is, if a solenoid is energized and a new bit of data shifted into the register the solenoid remains energized, the reduction in power to the solenoid for the relatively short 5 ms duration is insufficient to deenergize the solenoid. And, if the load to be actuated is an indicator lamp, the light difference from the 5 ms duration current change will be unnoticed by the human eye.

The shift register is first reset during the $t_1$–$t_2$ time. In the reset state the "0" sides of the shift register stages are at the most positive level. All capacitors 96 whose associated switch arms are closed will be charged leaving uncharged all capacitors whose switch arms are open. This is accomplished by lowering the potential of the capacitor reset line at the terminal 58 from +12 volts to ground, and when the capacitors 96 are charged, reapplying the potential to the terminal 58. This is done during $t_1$ –$t_3$ time by the initializing pulse 120.

When a start bit "1" is shifted into the first register stage, the complement ("0") output of this stage falls to ground. When this happens, since the associated capacitor 96-1 is charged, the fall of the output to ground causes the switch side of the associated capacitor 96-1 to go to the negative most (−12 volts) potential since there was an initial (12 volt) potential across the capacitor 96-1. This causes the emitter electrode of the transistor 100 to go negative and hence causes the transistor to conduct which in turn causes the output terminal 80 to fall. The length of time the terminal 80 will remain down depends on the time constant of the capacitors 96 and a series resistor 168. At $t_7$ time as the start bit is shifted into the second stage where the switch side of the capacitor 96-2 is at +12 volts, the fall of the output to ground results in no change in the output of the transistor 100 at $t_7$ time; and so on.

The switch sensing capacitor discharging path runs from the source of direct energizing potential (of +12 volts for example) through the return data transistor 100, the common series resistance element 168, the associated diodes 99 and capacitors 96 and a path to reference potential, shown here as ground, through the SCR devices 94. As the stages are consecutively triggered the capacitors 96 are discharged. The charged capacitors are discharged through the diodes 99-1 . . . **99-*n*, the resistor 168 and the circuit of the transistor 100**.

Thus, as the start bit proceeds down the shift register, charge is either dumped or not dumped from the capacitors 96 associated with those shift register positions, according to whether their associated switches 71 were closed or open. At each shift pulse, the output from the terminal 80 is examined. If it falls, then the switch 71 associated with the register position that has just received the start bit was closed. Otherwise it was open.

Once a capacitor 96 is discharged by the start bit, it will not be recharged because the capacitor reset line connected to the terminal 58 is positive (at +12 volts), and no other charging path exists. Therefore all bits following the start bit in the data stream into the register have no effect on the output of the contact sense circuit.

The shift register and switchbank as shown in FIG. 2 requires 5 lines and a reference potential line to handle the data and control signals. However, the shift register, shift and capacitor reset lines can be quite easily derived from the shift register reset pulse train. Hence the twisted pair transmission line can handle the transmission of two signals in one direction and one in the other, all simultaneously.

The data transmission is accomplished through standard techniques of frequency division multiplexing. The twisted pair line is terminated in a bridge network. This prevents the output from the transmitting amplifier modulator 90 from appearing at the input of the receiving amplifier 30.

In frequency division multiplexing the distributor 40 in FIG. 1 is a dual filter circuit delivering pulse envelopes corresponding to one frequency at the output terminals 42 and pulse envelopes corresponding to another and substantially different frequency at the other output terminals 44. A third frequency is generated by the oscillator 86 under control of the mono-stable flip-flop circuit 84 which is triggered by the serially generated return data at the output terminals 80. A filter at the central station converts the third frequency wave into digital data pulses in conventional manner.

Time division multiplexing is an alternate arrangement to be used. The timing of pulses over the transmission line is controlled by the central processing unit so that data pulses are separated from central pulses by triggering pulses which switch the distributor 40 to supply data pulses at the output terminals 42 and central pulses at the other terminals 44. Return data pulses are interposed in proper time sequence by the generator 86 under control of the monostable circuit 84.

Amplitude or level multiplexing is contemplated with three distinct levels of potential appearing on the transmission line 19. The distributor 40 is constituted by a Schmitt triggering circuit responsive to two levels for producing high level data pulses and low level control pulses with a wide hysteresis range of levels in between. The generator 86 then delivers return data pulses of amplitude intermediate the hysteresis range.

Figure 4:
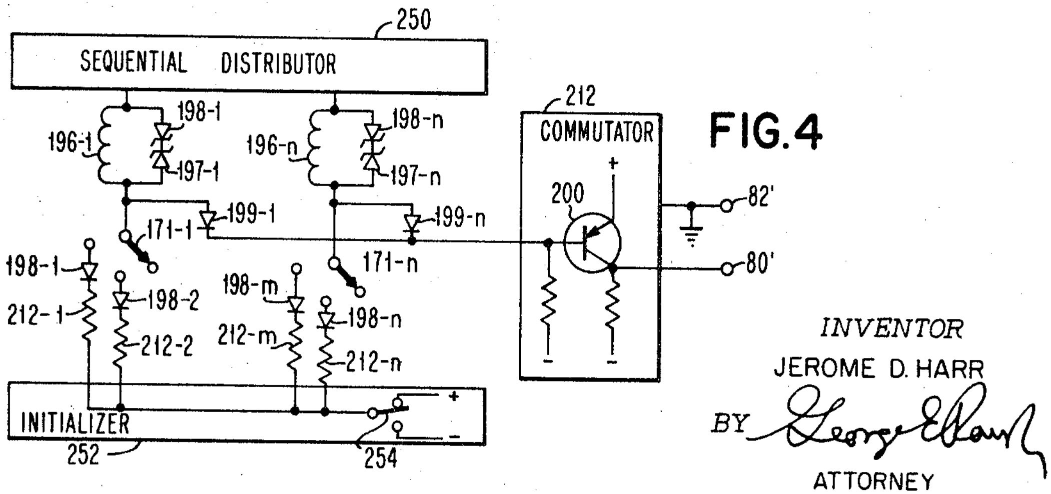
FIG. 4 is a diagram illustrating an alternate arrangement of the invention.

A current flow manifesting circuit arrangement is shown in FIG. 4. Inductors 196-1 and **196-*n* are shunted by Zener diodes 197-1, 198-1 and 197-*n*, 198-*n* respectively for limiting the voltage across the inducters. The shunted inductors are connected in sets with data representing switches 171-1 . . . 171-*n*, shown here as single-pole, triple-throw switches and current limiting resistors 212-1 . . . 212-*n*. Isolating diodes 198-1, 198-2, 198-*m* and 198-*n* are interposed between current limiting resistors 212-1 . . . 212-*n*. Other isolating diodes 199-1 . . . 199-*n* are arranged for coupling the pulses of current desired to a commutator transistor 200 much as in the earlier described embodiment. An initializer 252 may be arranged along conventional lines as described hereinbefore. For simplicity a switch 254** is shown for connecting the common line to a positive voltage source (18v for example) in operation and to a negative (−6v for example) source at reset pulse time. This alternate circuit operates much as the previous one except that current flow is sensed in place of potential charge for determining the data. For binary data, single-pole, single-throw switches with one diode and one resistor associated therewith are used as shown. Triple-throw switches and two resistors associated therewith are necessary for ternary data. Current flow sensing can easily be extended to decade data, if desired. Similar arrangements using other electric status manifesting elements will be employed by those skilled in the art as desired.

In operation, the terminal operates as follows: assume that some operation—e.g., printing or keyboard contact scanning—is to take place at a remote location ten times a second. The register is first reset and the data bits are then sent from the transmitter for the next 5 milliseconds. After each shift pulse sent from the central location, the sender looks for the status, for example the presence of the frequency, that indicates the contact status at the remote terminal. After all the data bits have been loaded into the remote register and all the switch position information has been received, the register becomes static and the proper indicators and solenoids are activated. This condition lasts for 100 ms, when the time comes for the next 5 ms register load,. Thus there is provided an inexpensive means for energizing solenoids or indicator lamps at a remote location in accordance with data, and at the same time, for sending back other data from the remote location to the central controller representing status of all the switches and contacts at the remote terminal. Communication with the remote terminal can thus be accomplished over a twisted pair of wires up to a mile in length.

While the invention has been shown and described particularly with reference to a preferred embodiment thereof, and various alternatives have been suggested, it should be understood that those skilled in the art may effect still further changes without departing from the spirit and the scope of the invention as defined hereinafter.

The invention claimed is:

1. Digital data terminal circuitry comprising
   a multiple of electric switch elements operably representative of digital data,
   a multiple of electric state manifesting elements each interconnected in a circuit set with one of said electric switch elements,
   a source of direct electric energizing potential connected across said circuit sets,
   initializing circuitry connected between said electric state manifesting elements and said source of potential,
   unilateral current flow devices interposed between said interconnected elements and said source of potential for isolating each set of said interconnected elements from all the other sets of said interconnected elements, and
   output data commutating circuitry connected to said manifesting elements for determining the status of said electric switch elements in accordance with the digital data represented thereby as reflected in said manifesting elements after initialization by way of said initializing circuitry and for delivering said output data sequentially.

2. Digital data terminal circuitry as defined in claim 1 and wherein
   said electric switch elements are contact making electric switches.

3. Binary data terminal circuitry as defined in claim 1 and wherein
   said electric state manifesting elements are electric capacitors.

4. Binary data terminal circuitry as defined in claim 1 and wherein
   said electric state manifesting elements are electric inductors 5. Binary data terminal circuitry as defined in claim 1 and wherein
   said unilateral current flow devices are semiconductor diodes.

6. Binary data terminal circuitry as defined in claim 3 and wherein
   said commutating circuitry comprises
   a transistor,
   further unilateral current flow devices individually interposed between said transistor and said electric state manifesting elements for isolating each of the latter from all other electric state manifesting elements, and
   means are coupled to said sets of interconnected elements for pulsing said commutating circuitry through said electric switch elements.

7. Binary data terminal circuitry as defined in claim 6 and wherein
   said pulsing means comprises a shift register.

8. Binary data terminal circuitry as defined in claim 7 and wherein
   said shift register comprises silicon control rectifier devices 9. Remote binary data terminal circuitry as defined in claim 8 and wherein
   load devices are connected to stages of said shaft register for actuation in accordance with data received at the terminal.

10. Remote binary data terminal circuitry comprising,
   data input terminals,
   a binary data register having a multiple of concatenated stages coupled to said input terminals,
   a multiple of electric components individual to stages of said binary data register for actuation thereby,
   a multiple of binary electric switch elements operably representative of data encoding apparatus,
   data output terminals,
   a source of direct potential,
   a multiple of capacitors individually connected to said switch elements and said stages of said binary data register,
   diode elements individually connecting said capacitors, said potential source and said switch components in circuitry for charging said capacitors in accordance with the status of actuation of the corresponding switch elements,
   a translating circuit coupling said capacitors to said data output terminals for transmitting data representative of the status of said switch elements in seriatim to said output terminals in synchronism with input data traversing said concatenated register stages, and
   further diode elements interposed between said capacitors and said translating circuit for isolating said capacitors one from the others.

11. Remote digital data terminal circuitry comprising,
   a shift register having a predetermined number of concatenated stages each with a component having a response that is slow with respect to the ripple speed of the register, a number, equal to said predetermined number, of electric circuit devices individual to said concatenated stages and having the capability of exhibiting a large change in electric characteristics in operation, a number, equal to said predetermined number, of electric circuit elements each having the capability of manifesting discrete electric characteristics in operation, unilateral electric devices connecting said circuit elements individually to said stages and to said circuit devices for manifesting operation of said circuit devices, and unilateral electric components for translating binary data indicative of the operation of said circuit devices as said concatenated stages are rippled while isolating said electric circuit elements one from the others.

12. Remote digital data terminal circuitry as defined in claim 11 and wherein said electric circuit elements comprise electric switching elements, and said electric circuit devices comprise electric capacitors.

* * * * *